(12) United States Patent
Ho et al.

(10) Patent No.: US 6,341,184 B1
(45) Date of Patent: Jan. 22, 2002

(54) LOW DRIVE VOLTAGE OPTICAL MODULATOR

(75) Inventors: Seng-Tiong Ho, Wheeling; Mee Koy Chin, Wilmette, both of IL (US)

(73) Assignees: Nannovation Technologies, Inc., Miami, FL (US); Northwestern University, Evanston, IL (US)

( * ) Notice: Subject to any disclaimer, the term of this patent is extended or adjusted under 35 U.S.C. 154(b) by 0 days.

(21) Appl. No.: 09/657,397

(22) Filed: Sep. 8, 2000

Related U.S. Application Data

(60) Provisional application No. 60/153,174, filed on Sep. 10, 1999.

(51) Int. Cl.[7] .................................. G02B 1/035
(52) U.S. Cl. ............... 385/3; 385/1; 385/2; 385/14; 385/129; 385/130; 385/131; 385/132
(58) Field of Search .................... 385/1, 2, 3, 14, 385/129, 130, 131 132

(56) References Cited

U.S. PATENT DOCUMENTS

| | | | |
|---|---|---|---|
| 4,709,978 A | * 12/1987 | Jackel | 385/3 |
| 4,758,060 A | * 7/1988 | Jaeger et al. | 385/3 |
| 4,763,974 A | * 8/1988 | Thaniyavarn | 385/3 |
| 4,899,042 A | * 2/1990 | Falk et al. | 385/14 X |
| 4,928,007 A | * 5/1990 | Fürstenau et al. | 341/137 |
| 5,168,534 A | * 12/1992 | McBrien et al. | 385/3 |
| 5,283,842 A | * 2/1994 | Hakogi et al. | 385/3 |
| 5,315,422 A | * 5/1994 | Utaka et al. | 359/107 |
| 5,408,544 A | * 4/1995 | Seino | 385/3 |
| 5,751,867 A | * 5/1998 | Schaffner et al. | 385/3 |
| 5,995,685 A | * 11/1999 | Seino | 385/3 |

* cited by examiner

Primary Examiner—Brian Healy
(74) Attorney, Agent, or Firm—Stroock & Stroock & Lavan LLP

(57) ABSTRACT

An optical modulator that includes a resonator near one arm of a Mach-Zehnder interferometer and that increases the optical length of that arm so as to introduce a phase-shift in an optical signal propagating in that arm when compared to an optical signal propagating in the other arm of the interferometer. The resonator also increases the electro-optic interaction between an electrical signal (i.e., the source of information in a modulated signal) and the optical devices (e.g., waveguides). A modulator constructed in accordance with the present invention is thus physically small than prior art modulators and requires a significantly reduced drive voltage to impart information on an optical signal.

32 Claims, 6 Drawing Sheets

LOW DRIVE VOLTAGE OPTICAL MODULATOR

CROSS-REFERENCE TO RELATED APPLICATION

This application claims priority to Provisional Patent Application Serial No. 60/153,174, filed on Sep. 10, 1999, pending.

FIELD OF THE INVENTION

The present invention is directed to an optical modulator and, more particularly, to an optical modulator that includes a Mach-Zehnder interferometer having a resonator coupled to one arm that increases the optical length of that arm and that also reduces the amplitude of a drive voltage signal required to introduce a phase-shift into an optical signal propagating through the arm to which the resonator is coupled.

BACKGROUND OF INVENTION

A typical Mach-Zehnder modulator includes an interferometer having an input waveguide, two arms that branch from the input waveguide, and an output waveguide at the junction of the two arms. An optical signal is directed into and propagates in the input waveguide, and is split between the two arms so that approximately one-half of the input optical signal propagates in each of the interferometer arms. A drive voltage is applied to one arm of the interferometer which changes the effective refractive index of that arm and introduces a phase-shift in an optical signal propagating in that arm. The phase-shifted optical signal combines with the non-phase-shifted optical signal at the output waveguide and produces amplitude modulation in the optical signal due to phase mismatch between the signals and the fact that parts of the two optical signals interfere both constructively and destructively. The output of the modulator is thus an amplitude modulated optical signal. A relative phase-shift between the optical signals in the two arms of approximately $\pi$ is required to achieve large signal modulation (i.e., the ability to switch the output of the modulator between on and off states). The voltage required to introduce a phase-shift of approximately $\pi$, $V_\pi$, is typically between 5 and 10 volts AC (VAC).

Prior art Mach-Zehnder modulators, such as those made from Lithium Niobate, are relatively large (e.g., about 10–60 millimeters long, measured generally as the length of the arm) and require a relatively high $V_\pi$ (e.g., between 5 and 10 VAC) because the electro-optic effect in such modulators is weak. Semiconductor Mach-Zehnder modulators can be smaller (e.g., about 1–20 millimeters long) than those constructed of Lithium Niobate due to stronger electro-optic effects for some semiconductor materials, when compared with Lithium Niobate. However, approximately 3 mm length of waveguide is still required to introduce a phase-shift of $\pi$ to an optical signal, and a drive voltage of between approximately 0.5 and 2 VAC may still be required.

There thus exists a need in the art for a modulator that overcomes the above-described shortcomings of the prior art.

SUMMARY OF THE INVENTION

The present invention is directed to a low drive voltage optical modulator that includes a Mach-Zehnder interferometer having a resonator located near one of its arms.

A Mach-Zehnder interferometer having an input waveguide that splits to form first and second arms, which converge to form an output waveguide. A resonator having a diameter of less than or equal to approximately 50 $\mu$m is located near one of the first and second arms and operatively coupled thereto across a gap having a width of less than or equal to approximately 0.5 $\mu$m. When an optical signal is directed into the input waveguide, that optical signal is split approximately between the arms; with a first portion of the optical signal propagating in the first arm and a second portion of the optical signal propagating in the second arm. The resonator is tuned to a predetermined wavelength (preferably matched to the wavelength of the optical signal directed into the waveguide by an optical source) and a portion of the optical signal propagating in the arm near the resonator is coupled to the resonator. An AC voltage applied to the resonator may cause the refractive index of the resonator to change, which may cause the optical length of the resonator to change thus imparting a phase-shift in the optical signal propagating therein. Thus, the optical signal propagating in the arm near the resonator, when viewed at a location optically downstream from the resonator, is phase-shifted with respect to the optical signal propagating in the other arm. When the phase-shifted signal recombines with the non-phase-shifted signal at the junction of the two arms (i.e., at the output waveguide), the optical signal propagating in the output waveguide and emerging therefrom is amplitude modulated because the optical signals emerging from the respective arms will interfere constructively and destructively due to the phase mismatch between those signals.

In another embodiment of the present invention, a respective resonator is located near both arms of the Mach-Zehnder interferometer. An AC drive voltage of approximately equal amplitude, but opposite polarity, is applied to the resonators to introduce opposite phase-shifts in the optical signal propagating through the two arms, thereby doubling the amount of phase-shift possible with a given voltage.

In yet another embodiment of the present invention, a low drive voltage optical modulator comprises a Mach-Zehnder interferometer having an input waveguide, first and second arms connected to the input waveguide, and an output waveguide connected to the first and second arms. The modulator of this embodiment also includes a phase-shifter that is operatively coupled to the first arm across a gap and that causes a predetermined phase shift in an optical signal propagating in the first arm.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to an optical modulator comprised of a Mach-Zelinder interferometer having a resonator located near one of the interferometer arms. A portion of the light propagating in the arm near the resonator is coupled into the resonator which is connected to an AC voltage source. By changing the amplitude of the AC voltage, the refractive index and optical path length of the resonator are changed, which causes a phase-shift in the optical signal propagating in the resonator, when compared to the optical signal propagating in the other arm of the interferometer. With a resonator diameter of less than approximately 50 $\mu$m, an optical modulator constructed in accordance with the present invention is significantly smaller than prior art modulators. In addition, a significantly smaller drive voltage (i.e., less than approximately 1 VAC) is required to introduce a desired phase-shift (e.g., $\pi°$) in an optical signal propagating in the resonator and in the arm near the resonator.

Figure 1:
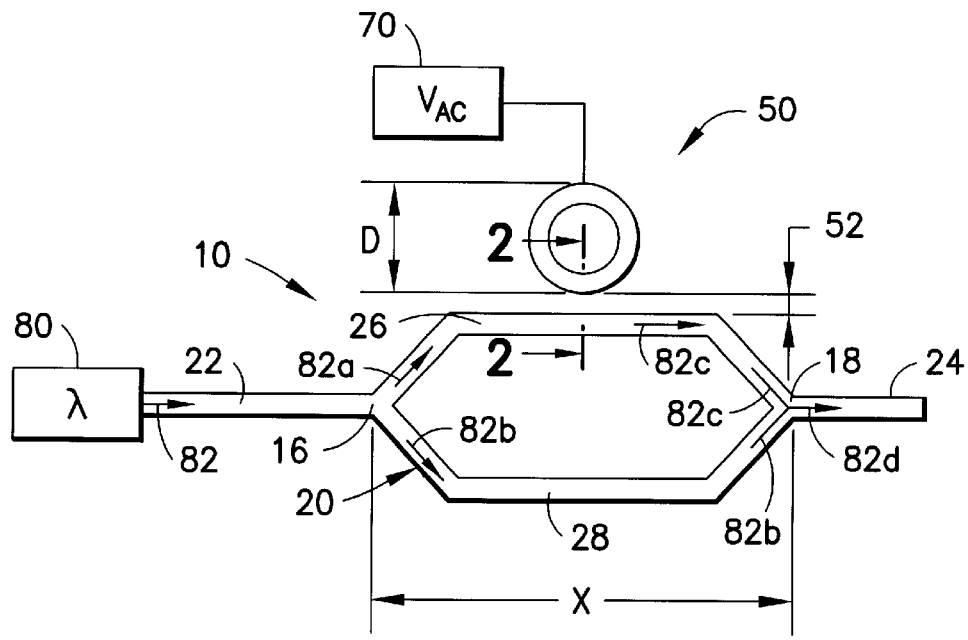
FIG. 1 is a schematic diagram of an optical modulator having a resonator located near one arm of a Mach-Zehnder interferometer and constructed in accordance with the present invention.

Referring now to the drawings in detail, a first embodiment of an optical modulator (also referred to herein as a Mach-Zehnder modulator) is depicted in FIG. 1 and generally designated by reference numeral 10. The modulator 10 includes a Mach-Zehnder interferometer 20 having an input waveguide 22 which splits at a junction 16 into two arms 26, 28. The interferometer 20 also includes an output waveguide 24 extending from a junction 18 of the two arms 26, 28.

Figure 2:
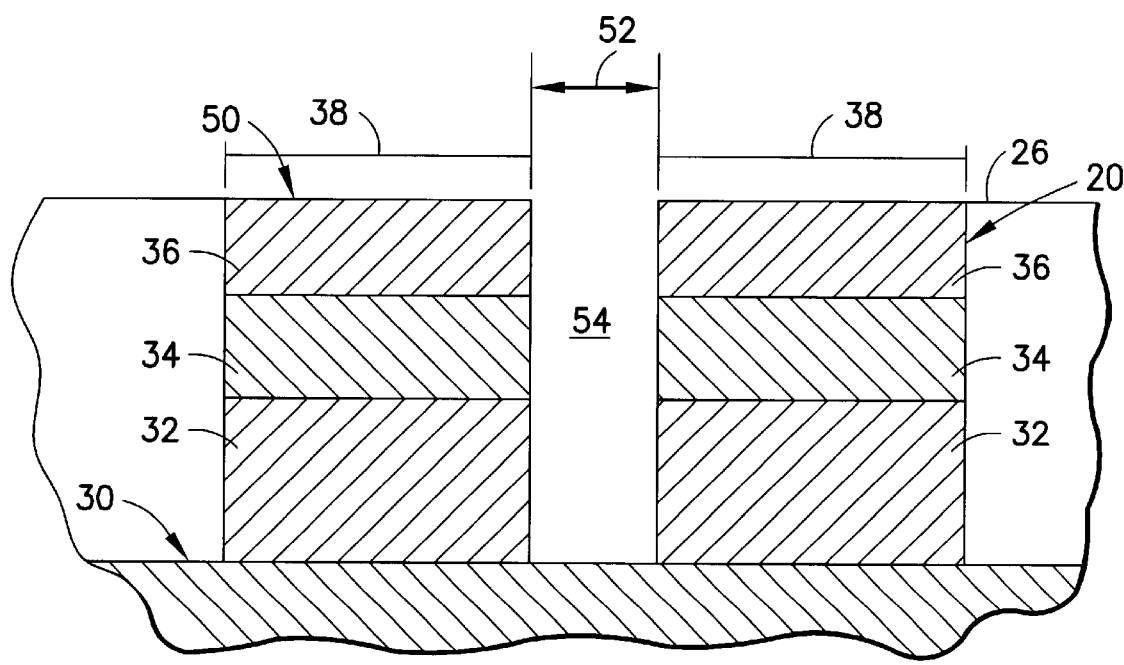
FIG. 2 is a cross-sectional view taken along the line 2—2 of FIG. 1.

With continued reference to FIG. 1 and with additional reference to FIG. 2, a resonator 50 is located near an arm 26 of the interferometer 20 and may be formed as a microcavity ring or disk. An optical cavity can be said to be an ideal microcavity when the cavity length $L_c$ is so small as to give a large $\Delta f_c$ value so that Beta(Freq) approaches unity (i.e. when $\Delta f_c$ is almost as large as $\Delta f_e$ so that (BetaFreq)=1.0). In practice, an optical cavity can be said to be a microcavity if it's (BetaFreq) is larger than approximately 0.03. It can be said to be a good microcavity if Beta(Freq) is larger than 0.1.

The resonator 50 is preferably operatively coupled to the arm 26 across a gap 52 generally defined by the equation:

$$\frac{2\lambda_{lg}}{\sqrt{n_{res}^2 - n_{gap}^2}} \quad (1)$$

where $\lambda_{lg}$ is the longest operating wavelength of light in $\lambda$m in the resonator 50, $n_{res}$ is the effective propagating refractive index of light in the resonator 50, and $n_{gap}$ is the effective refractive index of light in the gap 52. The gap 52 is filled with a medium 54 having a relatively low refractive index, $\eta_{low}$, when compared with the refractive indices of the resonator 50 and interferometer 20 (which, in a preferred embodiment, are approximately the same). Preferably, the medium 54 has a refractive index in the range of between approximately 1.0 and approximately 2.0. For example, the gap 52 may be filled with air or with one or more other materials having a refractive index higher than air such as, by way of non-limiting example, acrylic, epoxy, silicon dioxide, silicon nitride, spin-on glass, low absorption polymers, photoresist, poly-methyl metacrorate, and polyimide.

The interferometer 20 depicted in FIG. 1 (and FIG. 3), and constructed in accordance with the present invention, includes nearly identically constructed arms 26, 28, and the location of the resonator 50 near either one of the arms 26, 28 is thus a routine matter of design choice. It being obvious to persons skilled in the art from the disclosure provided herein that operation of the inventive modulator 10 does not depend on locating the resonator 50 near a particular one of the arms 26, 28. Thus, although the resonator 50 is disclosed and depicted near arm 26, it may alternatively be located near arm 28 as a routine matter or design choice.

An AC voltage source 70 is connected to the resonator 50 and applies a drive voltage having a variable amplitude to the resonator 50 which causes the effective refractive index and optical path length of the resonator 50 to change. Consequently, the optical signal propagating in the resonator 50 experiences a phase-shift based on the amplitude of the drive voltage. Preferably, the applied drive voltage varies so as to cause a phase-shift in the optical signal propagating in the resonator 50 of between approximately 0° and $\pi°$. The drive voltage required to cause such a phase-shift is referred to herein as $V_\pi$, and is generally defined by:

$$V_\pi \approx \frac{(1-r)\lambda}{L\left(\frac{dn_e}{dV}\right)} \quad (2)$$

where r is the mirror reflectivity of the resonator (defined by equation (4) below), L is the optical path length of the resonator 50 and defined as $L=2\pi R$ (R is the resonator radius), and $n_e$ is the effective refractive index of the resonator 50.

An optical source 80 such as, for example, a laser, is coupled to the input waveguide 22 and directs a source optical signal 82 having a predetermined wavelength into the input waveguide 22. The source optical signal 82 splits at the junction 16 so that a first portion of the optical signal 82a (approximately one-half determined in terms of the power level of the optical signal 82) propagates in arm 26 and a second portion 82b propagates in arm 28. The second portion 82b emerges from the arm 28 and into the output waveguide 24 with the same phase as the source optical signal 82.

The first portion 82a is partially coupled from the arm 26 to the resonator 50 via resonant waveguide coupling. The resonator introduces a predetermined phase-shift in the optical signal, and the phase-shifted optical signal 82c is coupled back to the arm 26 via resonant waveguide coupling. When the phase-shifted signal 82c and the non-phase-shifted signal 82b combine at the junction 18 of the arms 26, 28, the phase-shifted signal 82c will introduce amplitude modulations into the non-phase-shifted signal 82b so that the signal propagating in the output waveguide 24 is an amplitude modulated signal 82d. The amplitude modulation is caused by the relative phase-shift between signals 82b and 82c and further due to the fact that, when combined, those signals will interfere both constructively and destructively.

The drive voltage represents information content (e.g., text, graphs, video, etc.) derived from various art-recognized and generally known electronic devices, circuits, and the like. Variations in the amplitude of the drive voltage cause different phase-shifts to be imparted on the optical signal. The different phase-shifts, in turn, cause amplitude modulation of the non-phase-shifted optical signal 82b when that signal and the phase-shifted optical signal 82c recombine.

Ideally, a ring resonator 50 coupled to a substantially straight waveguide, i.e., an arm 26 of the Mach-Zehnder interferometer 20, acts as an all-pass filter having a reflection coefficient of (for a single input, single output resonator 50) given by:

$$r_{11} = \frac{r - e^{-j\delta}}{1 - re^{-j\delta}} \quad (3)$$

Where, $$\delta = \frac{2\pi}{\lambda} n_e L = n_e \frac{\omega}{c} L = 2\pi \frac{\omega}{\Delta \omega_{FSR}} \quad (4)$$

and, where r is the mirror reflectivity of the resonator 50 (i.e., waveguide), L is the round-trip optical path length experienced by an optical signal propagating in the resonator 50 and is defined as $2\pi R = m\lambda$ where R is the radius of the resonator and m is a positive integer. In equation (5), $n_e$ is the effective refractive index of the resonator 50, $\lambda$ is the optical wavelength of the optical signal propagating in the resonator 50, and $\Delta f_{FSR} = c/(n_e L)$ defines the change in the free spectral range of the optical signal 82. The mirror reflectivity r determined the number of times an optical signal travels, round-trip, through the resonator 50, and is related to the power coupling factor (C) between the resonator 50 and the arm 26 of the interferometer 20 and is defined by:

$$r = \sqrt{1-C} \quad (5)$$

Equation (3), which defines the reflection coefficient of a single input, single output resonator 50, has both amplitude and phase components. In an ideal resonator 50 (i.e., a lossless resonator 50), the amplitude component of equation (3) is approximately equal to 1 for all frequencies (i.e., an ideal resonator 50 operates as an all-pass filter). However, the phase component is dependent upon $\delta$ which may be any of the frequency, refractive index of the resonator 50, or optical path length L, and is given by:

$$\phi(\delta) = \tan^{-1}\left(\frac{\sin\delta}{r - \cos\delta}\right) - \tan^{-1}\left(\frac{r\sin\delta}{1 - r\cos\delta}\right) \quad (6)$$

Figure 4:
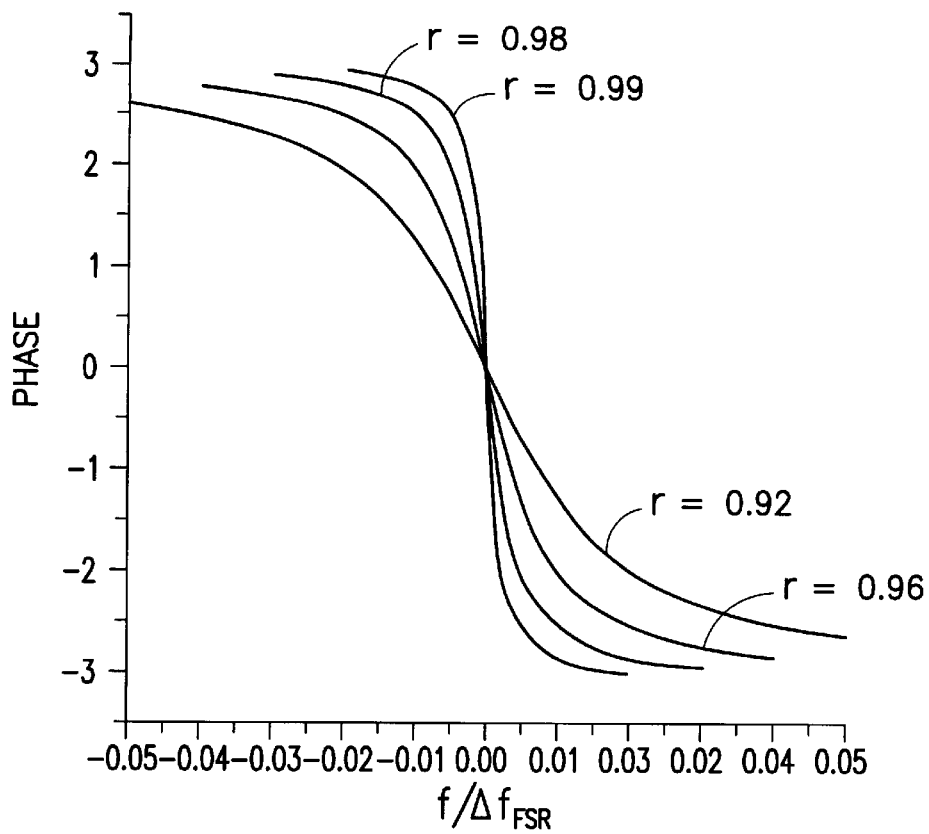
FIG. 4 is a graphical depiction of the phase response of an ideal resonator for four different values of the resonator reflectivity.

The phase $\phi$ defined by equation (6) is graphically depicted in FIG. 4 as a function of $f/\Delta f_{FSR}$, or $\delta/2\pi$ for different values of reflectivity r of the resonator 50. From FIG. 4 it is apparent that the phase changes from $\pi$ to $-\pi$ across a small part of the free spectral range, and that the phase change is substantially linear about the central part of the free spectral range. Greater or lesser linearity in changes in phase in an optical signal can be achieved by designing the resonator 50 to have a specific reflectivity r.

Figure 5:
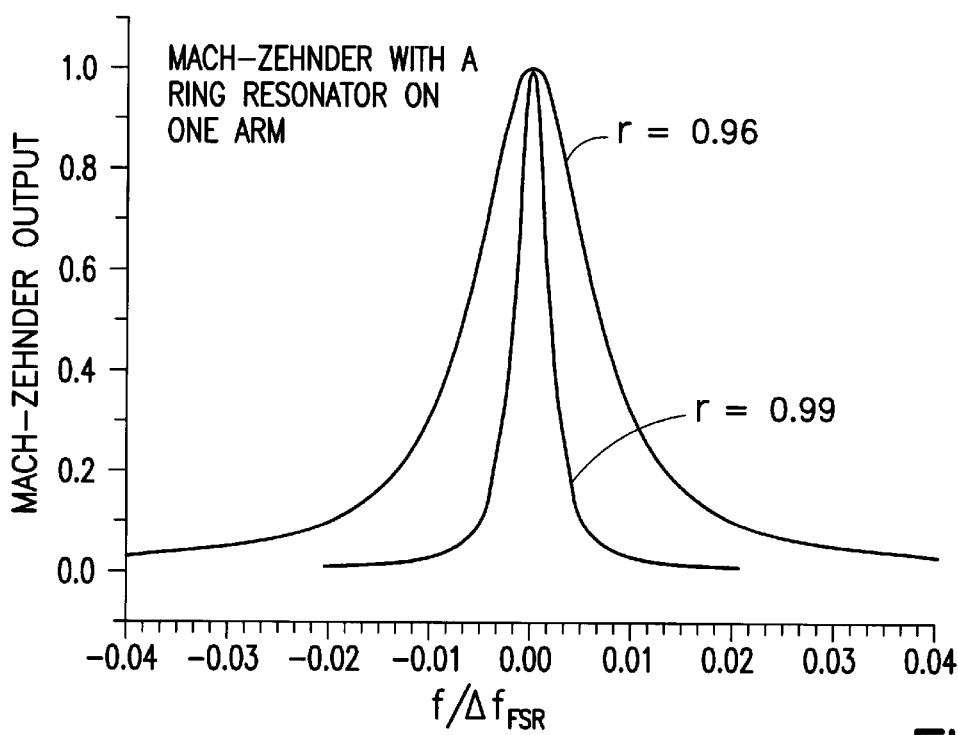
FIG. 5 is a graphical depiction of the output of an ideal interferometer for two different values of the resonator reflectivity.

The output of an ideal Mach-Zehnder interferometer 20 having a ring resonator 50 located near one arm 26 is given by equation (7) and depicted graphically in FIG. 5. From equation (7) it is apparent that the interferometer 20 output changes from 0 to 1 for a change in phase of approximately $\pi$.

$$I_o = I_{in} \tfrac{1}{2}(1 + \cos\phi) \quad (7)$$

The present invention may be used for both analog and digital applications. For analog applications such as, for example, cable television, small signal or partial modulation is performed in which the output of the interferometer 20 does not switch completely between an on and an off state. For digital applications, large signal or complete modulation is performed in which the output of the interferometer 20 switches between discrete and discernible on and off states.

Figure 6:
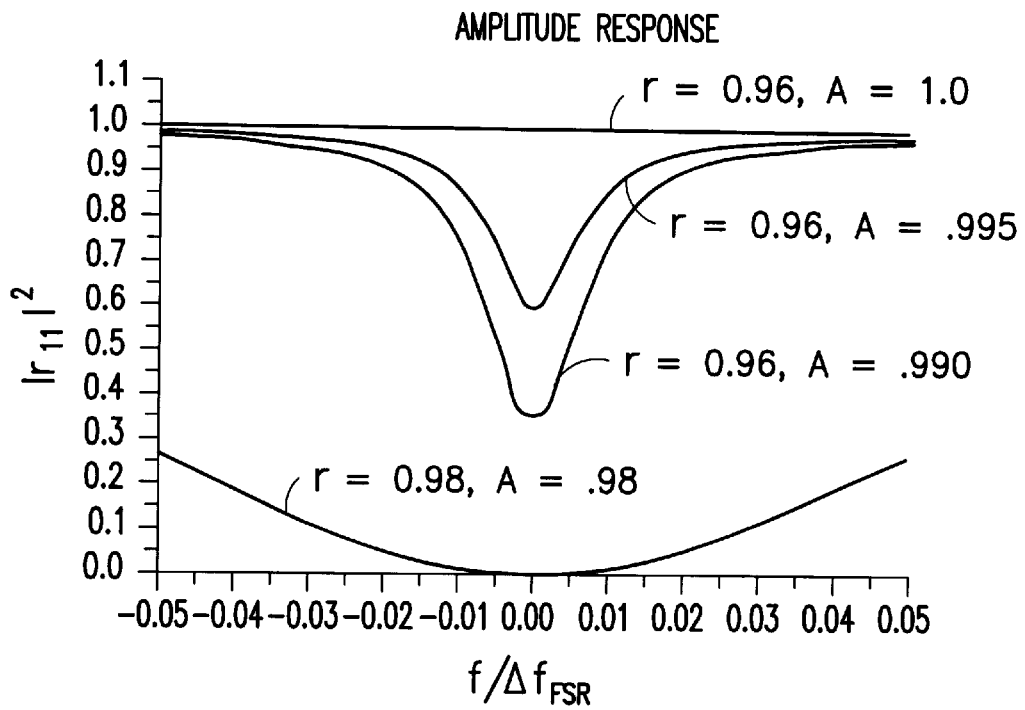
FIG. 6 is a graphical depiction of the amplitude response of a resonator for four different values of resonator reflectivity.

The description and equations provided above (see, e.g., equations (3), (4), (5) and (6)) are directed to an ideal or nearly ideal (i.e., lossless) resonator 50. However, when loss is present in the resonator 50, the reflection coefficient (previously defined herein by Eq. (3)) is defined by:

$$r_{11} = \frac{r - Ae^{-j\delta}}{1 - rAe^{-j\delta}}, \quad (8)$$

where A represents amplitude and is defined by $\exp(-\alpha L/2)$, and where $\alpha$ is the power loss coefficient and depends on the material from which the resonator 50 (i.e., waveguide) is constructed. Equation (8) thus represents a resonator 50 that is no longer an all-pass filter but rather, that is tuned to a particular frequency (wavelength). The amplitude part of equation (8) is now given by:

$$|r_{11}|^2 = \frac{r^2 + A^2 - 2rA\cos\delta}{1 + r^2A^2 - 2rA\cos\delta} \quad (9)$$

and is depicted graphically in FIG. 6 for different combinational values of r and A over the free spectral range. It can be seen from FIG. 6 that amplitude A decreases about the resonant frequency (or wavelength) which implies that there is amplitude modulation associated with the phase modulation. The amplitude drop at resonance is also due, at least in part, to the fact that an optical signal will complete more round-trip loops in the resonator 50 before coupling out of the resonator 50 and into the arm 26. Since loss in the resonator 50 is maximized at resonance, the effect of loss is detrimental on the performance of the resonator 50 and modulator 10 constructed in accordance with the present invention.

The change in amplitude can be taken into account in considering the Mach-Zehnder output. Thus Instead of Eq. (7), the output of the interferometer 20 can be expressed as:

$$I_o = I_{in} \tfrac{1}{4}[1 + |r_{11}(\delta)|^2 + 2r|_{11}(\delta)|\cos(\phi(\delta))] \quad (10)$$

Figure 8:
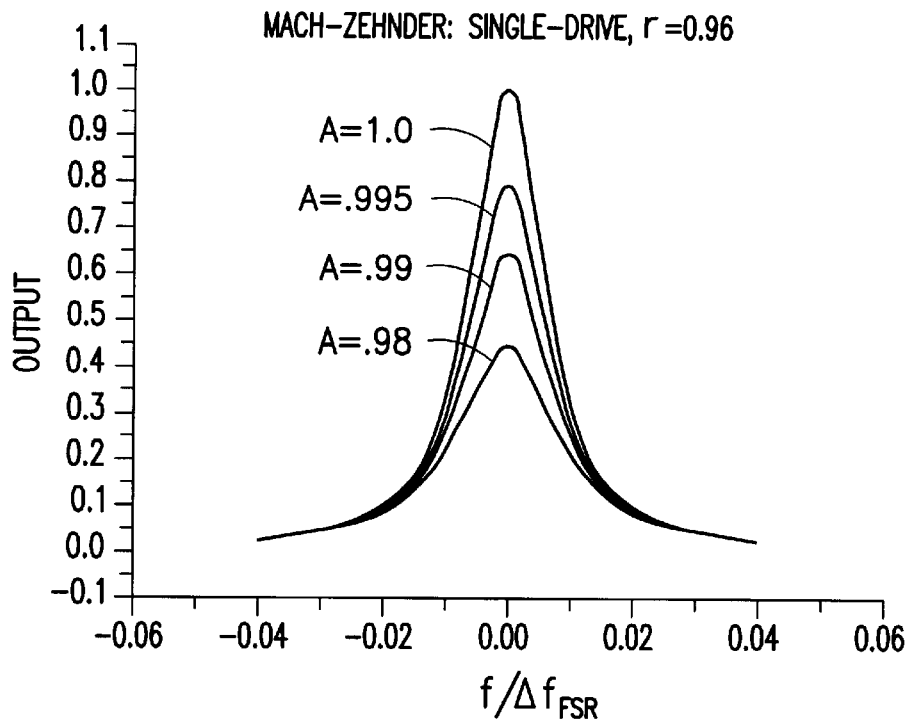
FIG. 8 is a graphical depiction of the output of an interferometer for different values of resonator reflectivity and considering the effects of loss in the resonator.

The interferometer 20 output is depicted in FIG. 8 for different values of A.

Figure 7:
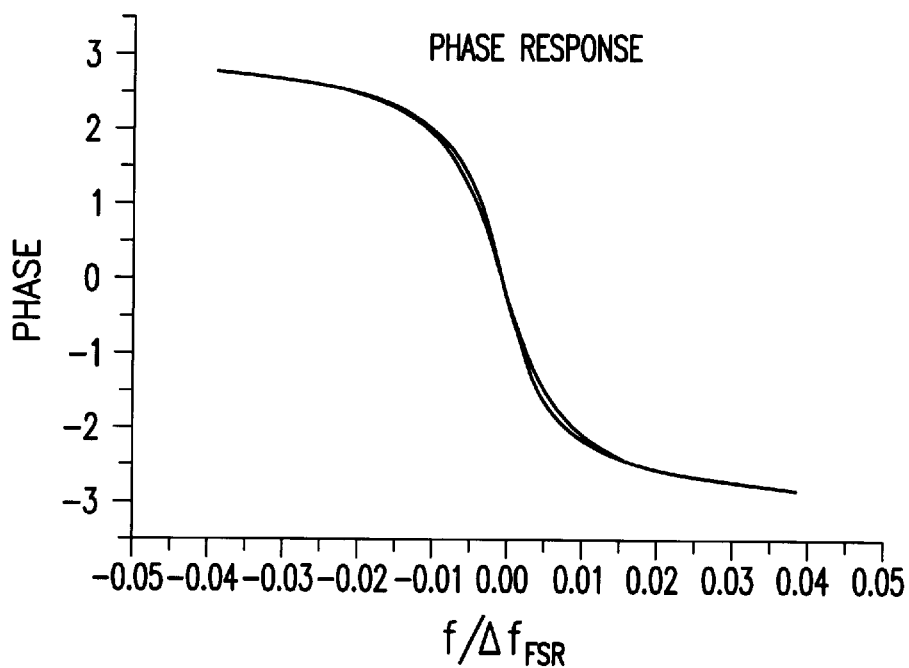
FIG. 7 is a graphical depiction of the phase response of a resonator for two different values of the resonator reflectivity and considering the effects of loss in the resonator.

Phase, on the other hand, is not sensitive to loss, as depicted graphically in FIG. 7, where the phase-shifts for different combinational values of r and A are nearly indistinguishable.

The advantages of the present invention may be more apparent by comparison of GaAs-based and InP-based modulators. For a GaAs modulator 10 having a resonator 50 with a coupling factor of approximately 8%, r will be approximately equal to 0.96. For an interferometer arm length approximately equal to 100 μm, and an optical signal wavelength λ approximately equal to 1.55 μm, a change in δ of approximately 0.014×2π is required to effect a phase-shift of approximately π in the optical signal 82. Consequently, the required change in $n_e$ (i.e., $\Delta n_e$, the effective refractive index of the resonator 50) is approximately equal to $0.014\lambda/L \sim 2.2 \times 10^{-4}$. Such a small shift can be easily achieved at very low voltage. For example, utilizing the linear electro-optic effect available with GaAs semiconductor material: $\Delta n_e = (n^3/2)r_{41}\Gamma E$, where $r_{41}=1.5\times 10^{-10}$ cm/V is typical for GaAs material at 1.55 μm wavelength, E=V/d, d=0.5 μm is the thickness of the intrinsic region in a P-I-N diode waveguide structure, and n=3, Γ=0.8 is the optical confinement factor. For such a device construction, a drive voltage, derived as $dn_e/dV=3.24\times 10^{-5}$, and $V_\pi=2d\Delta n_e/(n^3 r_{41}\Gamma)\sim 6.7$, VAC, is required.

This can be significantly improved by utilizing the quadratic electro-optic effect available with InP-based semiconductor material by designing the material wavelength to be nearer to 1.55 μm. In this case, $V_\pi$ would be approximately 0.5 VAC. The same performance can be obtained for λ=1.3 μm. By further optimizing the design of the resonator to give r=0.99, $\Delta n_e$ can be reduced to approximately $0.004\lambda/L=4.6\times 10^{-5}$, about 5 times smaller than required for the case where r=0.96. It is thus possible to achieve a $V_\pi$ of about 0.1 VAC when InP-based semiconductor material is used.

Figure 3:
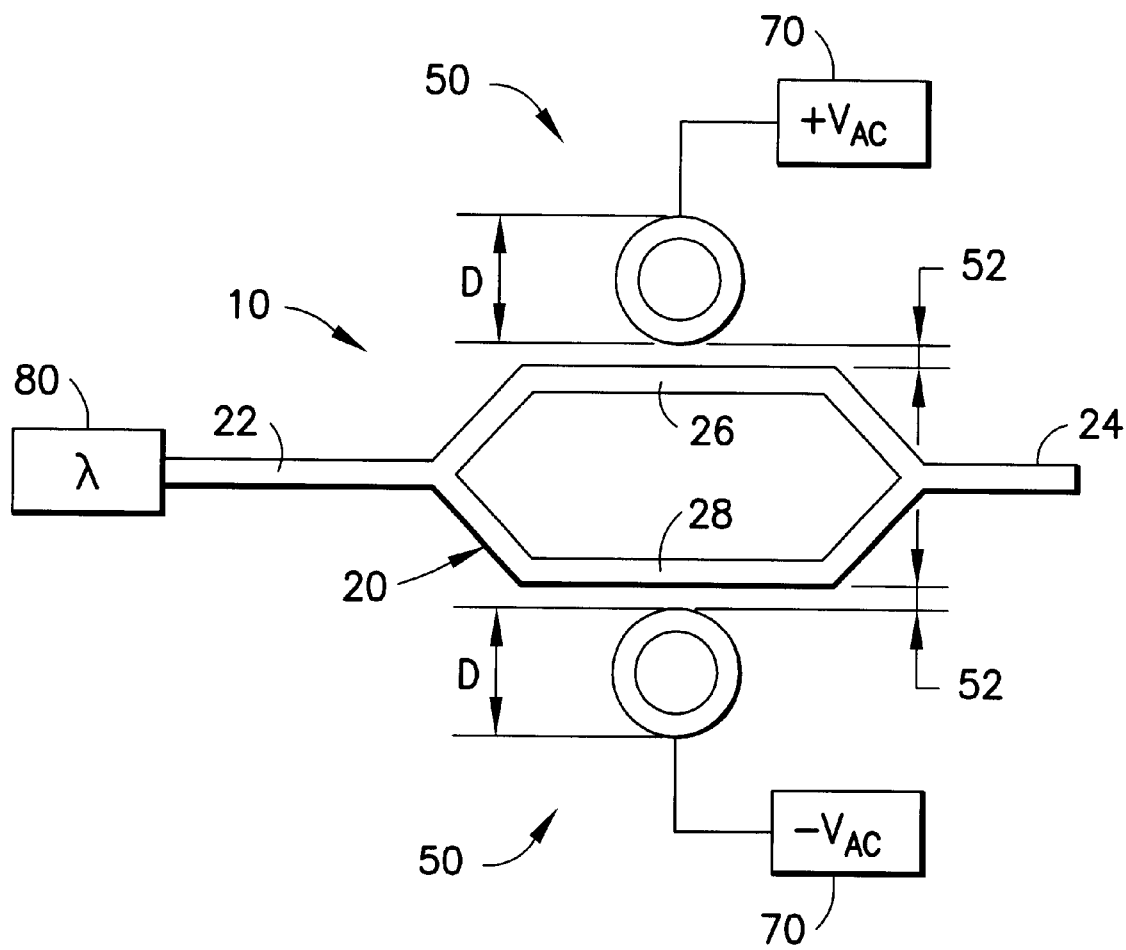
FIG. 3 is a schematic diagram of an optical modulator having a respective resonator near both arms of a Mach-Zehnder interferometer and constructed in accordance with the present invention.

Another embodiment of the present invention is depicted in FIG. 3. Like numbers are used to indicate like structures and the primary difference of the optical modulator 100 is that a respective resonator 50 is provided near each arm 26, 28 of the interferometer 20. Each resonator is operatively coupled to its respective arm 26, 28 across a gap 52 having a dimension defined by equation (1), above. A respective voltage source 70 is connected to each resonator 50. An AC drive voltage of approximately equal amplitude, but opposite polarity, is applied to the resonators 50 to introduce opposite phase-shifts in the optical signal propagating through the two arms thereby doubling the amount of phase-shift possible with a given drive voltage.

For a linear electro-optic effect, and using the symmetry of $r_{11}$ ($r_{11}(\delta)=r_{11}(-\delta)$), the output of the interferometer 20 in FIG. 3 is given by:

$$I_o = I_{in} \tfrac{1}{2} |r_{11}(\delta)|^2 (1+\cos(2\phi(\delta))) \qquad (11)$$

Figure 9:
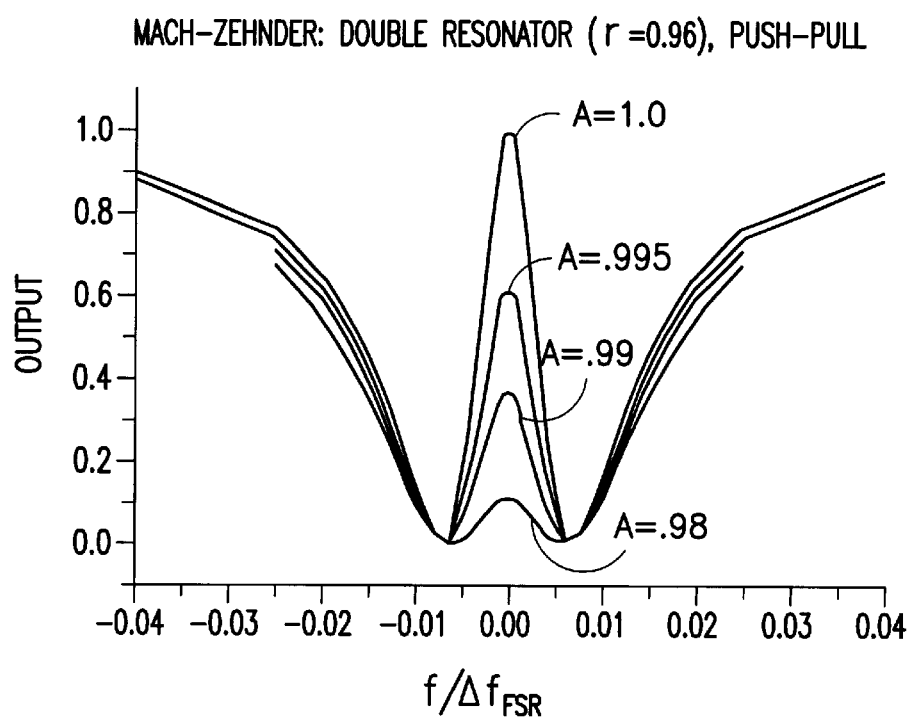
FIG. 9 is a graphical depiction of the output of an interferometer having two resonators and for different values of resonator reflectivity and considering the effects of loss in each resonator.

This is depicted graphically in FIG. 9, where it can be seen that the change in output occurs over a much smaller range of δ compared to the single-resonator configuration of FIG. 1.

The operational speed (i.e., throughput) of the resonator 50 is limited by the amount of time that the optical signal remains in the resonator 50. That time is given by:

$$\tau \equiv \frac{d\phi}{d\omega} = \frac{d\phi}{d\delta}\frac{\partial\delta}{\partial\omega} = -\left(\frac{1-r\cos\delta}{(1+r^2-2r\cos\delta_1)}\right)\frac{L}{c}n_e \qquad (12)$$

The bandwidth of the resonator 50 is then given by $\Delta f = 1/(2\pi\tau)$.

Figure 10:
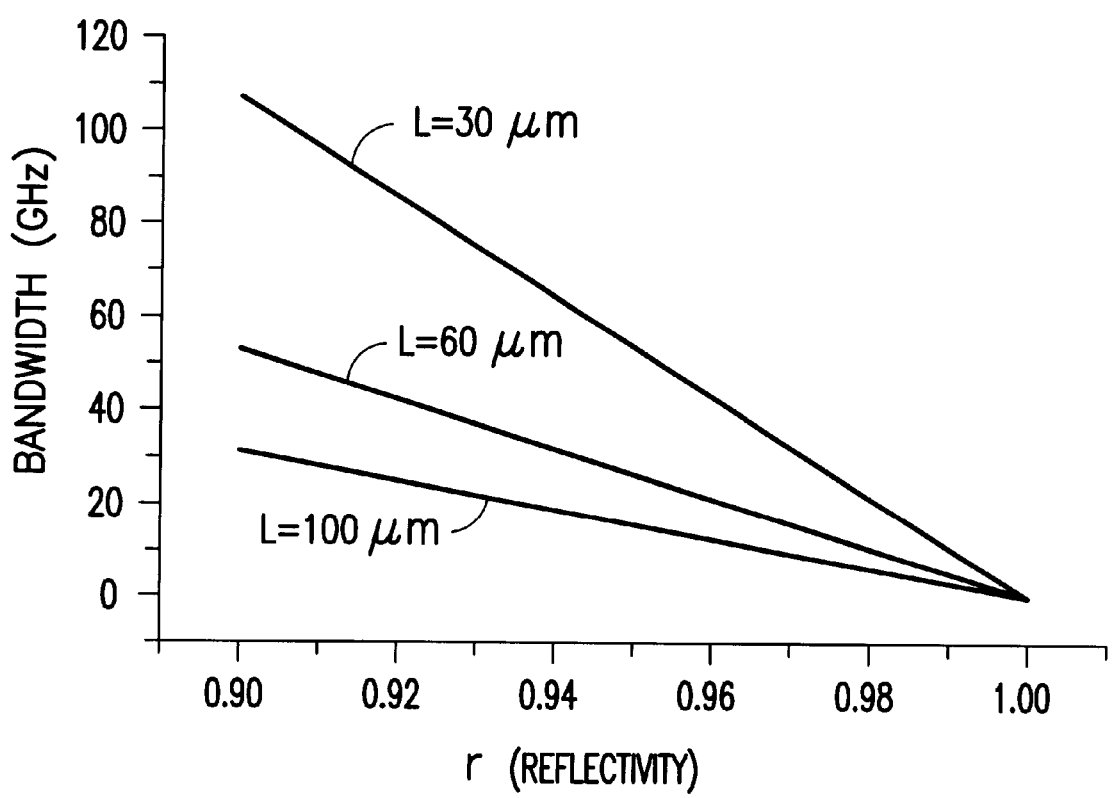
FIG. 10 is a graphical depiction of bandwidth versus resonator reflectivity for three different optical path lengths.

A maximum time delay of an optical signal in the resonator 50 occurs when cos δ=1, and is given by $\tau_m = \tau_o/(1-r)$, where $\tau_o = n_e L/C$. Since the time delay, τ, is a function of the optical length of the resonator, which is a function of voltage, the average τ during a modulation cycle is $\tau_m/2$. The bandwidth of the resonator 50 is then given by:

$$\Delta f \approx \frac{c}{\pi n_e} \frac{1-r}{L} \qquad (13)$$

from which it can be seen that the bandwidth (i.e., operational speed) of the resonator 50 is inversely proportional to the optical path length L. Bandwidths are plotted in FIG. 10 for various combinations of r and L. For a bandwidth approximately equal to 40 GHz, an optical path length L of about 30 μm will maintain a reflectivity r of approximately 0.96. This implies that $V_\pi$ will be about three times larger than the case where the optical path length is approximately equal to 100 μm.

Both the drive voltage $V_\pi$ (Eq. (2)) and the bandwidth (Eq. 13)) depend on r and L. Consequently, the smaller the drive voltage $V_\pi$, the smaller the bandwidth. A useful specification parameter for a resonator 50 constructed in accordance with the present invention is thus the bandwidth per unit drive voltage, which is given by:

$$\frac{\Delta f}{V} = \frac{c}{\pi \lambda n_e} \frac{dn_e}{dV} \qquad (14)$$

For a given wavelength and waveguide structure, the specification parameter is only proportional to $dn_e/dV$, which represent the magnitude of the electro-optic effect. For the linear electro-optic effect at a wavelength approximately equal to 1.55 μm, Δf/V is a constant equal to approximately 0.665 GHz/Volt. For the quadratic electro-optic effect, $\Delta n_e$ is approximately equal to $(\tfrac{1}{2})n_e^3 sE^2$, and the effect can be up to 100 times larger than the linear electro-optic effect, depending on the energy detuning. The variable s in the preceding equation for $\Delta n_e$ can range from about $6\times 10^{-16}$ cm$^2$/V$^2$ to about $2\times 10^{-13}$ cm$^2$/V$^2$. However, since the figure of merit Δf/V is not a constant, a more effective figure of merit may be Δf/V$^2$, which is proportional to the bandwidth per unit drive power.

The −3 dB electrical bandwidth limited by the RC constant of the resonator 50 is given by $\Delta f = 1/2\pi RC$, where R=50 ohms, and C is the electrode capacitance, defined by $C=\epsilon_s(wL/d)$, where $\epsilon_s$ is the permittivity, w is the waveguide width, and d is the intrinsic layer thickness. The parasitic capacitance can be neglected. For w, d and L in μm, and $\epsilon_s=12\epsilon_o$, then:

$$\Delta f = 30{,}000 d/(wL)\, \text{GHz} \qquad (15)$$

For L=100 μm, w=0.5 μm and d=0.5 μm, the RC-limited bandwidth is thus approximately equal to 300 GHz. By comparison, conventional waveguide electroabsorption modulators are between approximately 200–500 microns long, and have widths of between approximately 2–3 μm, and have typical RC-limited bandwidths of between approximately 10–40 GHz.

Referring next to FIG. 2, a resonator 50 and one arm 26 of an interferometer 20 are depicted in cross-section. Both the resonator 50 and interferometer 20 are preferably identically constructed, and may comprise either a photonic-well or a photonic-wire waveguide device. Exemplary photonic-wire and photonic-well devices are respectively disclosed in U.S. Pat. Nos. 5,878,070 and 5,790,583, and an exemplary resonator is disclosed in U.S. Pat. No. 5,926,496, the entire disclosure of each of those patents being incorporated herein by reference. Since the resonator 50 and interferometer 20 are nearly identically constructed, the following description is directed to the resonator 50, it being understood that such description applies equally to the interferometer 20. In addition, the resonator 50 and/or interferometer 20 may also each be referred to herein as a waveguide.

With continued reference to FIG. 2, the resonator 50 is formed of semiconductor materials for on-chip integration with other semiconductor devices such as a semiconductor laser. A wafer epitaxial growth process is used to form the various semiconductor layers of the resonator 50 on a substrate 30. As shown in the embodiment of FIG. 2, a first cladding layer 32 of InP is formed on a substrate 30 of InP. A core 34 of InGaAsP is formed on the first cladding layer 32 and a second cladding layer 36 of InP is formed on the core 34. The lower cladding layer 32 is suitably doped to form n-type semiconductor material, and the upper cladding layer 36 is suitably doped to form p-type semiconductor material, thus forming a P-I-N structure of stacked, layered semiconductor materials.

The substrate 30 in this embodiment has a refractive index approximately equal to 3.2. The respective refractive indices of the core 34 and first and second cladding layers 32, 36 are discussed in more detail below. In the embodiment depicted in FIG. 2, the first cladding layer has a thickness of approximately 1.5 $\mu$m, the core 34 has a thickness of approximately 0.65 $\mu$m, and the second cladding layer 36 has a thickness of approximately 0.85 $\mu$m.

With continued reference to FIG. 2, for a photonic-well waveguide resonator 50, the core 34 is a relatively high refractive index semiconductor material having a refractive index $n_{core}$ greater than about 2.5, such as from about 3 to about 3.5 and above, for InGaAsP, AlGaAs, InGaN/AlGaN materials. Typical low refractive index mediums 54 described below for use in practicing the present invention have refractive index $n_{low}$ below about 2.0, preferably below 1.6, such as from about 1.5 to about 1.0. The ratio of the refractive indices $n_{core}/n_{low}$ is preferably larger than about 1.3. The relatively low refractive index medium 54 includes air (refractive index of 1) and serves to spatially confine photons tightly in directions perpendicular to their circumferential propagation direction in the waveguide core 34. Other low refractive index mediums 54 that may be used include acrylic, epoxy, silicon dioxide ($SiO_2$), aluminum oxide, silicon nitride, spin-on glass, polymers with low absorption at the emission wavelength, photoresist, polymethyl metacrorate, and polyimide. For a photonic-wire resonator (described in more detail below), the core 34 is sandwiched between the lower and upper cladding layers 32, 36 which may comprise a relatively low refractive index material, as described above.

In a photonic-well resonator 50, the lower and upper cladding layers 32, 36 disposed below and on top of the waveguide core 34 have a relatively high refractive index as compared to the low refractive index medium 54 and thus weakly confine photons in the resonator. The cladding layers 32, 36 may have a refractive index of about 3.1 as compared to the refractive index of 1 for air medium 54 or of 1.5 for silica medium 54. The refractive index of cladding layers 32, 36 is slightly less than the refractive index of core 34, which is about 3.4.

In a photonic-wire resonator 50, the lower and upper cladding layers 23, 36 disposed below and on top of the waveguide core 34 have a relatively low refractive index as compared to the refractive index of the core 34 and thus strongly confine photons in the resonator.

In practicing embodiments of the invention, a photonic-well resonator 50 can comprise semiconductor materials $In_xGa_{1-x}As_yP_{1-y}/In_xAl_{1-x-y}Ga_yAs$ as the $n_{core}$ and $n_{high}$ materials and an aforementioned material with a refractive index of about 1.6 or lower as the $n_{low}$ material. Alternately, the photonic-well resonator 50 may comprise semiconductor materials $In_xGa_{1-x}N/Al_xGa_{1-x}N$ as the $n_{core}$ and $n_{high}$ materials and a material with a refractive index of about 1.6 or lower as the $n_{low}$ material. Still further, the photonic-well resonator 50 may comprise semiconductor materials $Al_xGa_{1-x}As$ or $In_xGa_{1-x}P$ as the $n_{core}$ and $n_{high}$ materials and a material with a refractive index of about 1.6 or lower as the $n_{low}$ material.

By constructing an interferometer 10, 100 as described above, including a resonator operatively coupled to one arm, the optical length of that arm may be increased so as to introduce a phase-shift in an optical signal propagating in that arm when compared to an optical signal propagating in the other arm of the interferometer. The inventive modulator also exhibits the quadratic electro-optic effect which can cause a change in the refractive index of the resonator proportional to the square of the electric field (i.e., voltage) applied to the resonator. Thus, larger changes in refractive index are possible with smaller voltages. As a result, both the physical length of the modulator and the voltage necessary to effect a $\pi$ phase-shift in an optical signal are significantly reduced.

In accordance with the present invention, a resonator may be provided as part of a Mach-Zehnder interferometer to construct a highly efficient optical phase modulator. A drive voltage of less than approximately 0.1 volt may provide a $\pi$ phase-shift in an optical signal when the quadratic electro-optic effect is present; which is generally true for InP-based photonic-well or photonic-wire material structures. Such a low drive voltage may also be achieved by designing the coupling factor between the resonator and the Mach Zehnder interferometer (i.e., waveguide) to be very weak, e.g. less than approximately 2%. If the linear electro-optic effect is present, which is typically the case for GaAs-based materials, a low drive voltage of approximately 1 volt may provide the desired $\pi$ phase-shift by using a push-pull configuration which provides a resonator near each arm of the Mach-Zehnder interferometer.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It will thus be seen that the objects set forth above, among those made apparent from the preceding description, are efficiently attained and, since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A low drive voltage optical modulator comprising:
   a Mach-Zehnder interferometer having an input waveguide, first and second arms connected to said input waveguide splitting an input optical signal having a predetermined wavelength into a first portion and a second portion, and an output waveguide connected to said first and second arms;

a resonator having a refractive index and being operatively coupled to one of said first and said second arms across a gap; and a voltage source connected to said resonator for providing a drive voltage thereto, wherein changes in amplitude of the drive voltage cause said resonator refractive index to change;

said changes in said resonator refractive index causing a phase-shift in the first portion of the optical signal propagating in said first arm relative to the second portion of the optical signal propagating in said second arm.

2. The optical modulator of claim 1, wherein said Mach-Zehnder interferometer and said resonator each comprise a relatively high refractive index photonic wire semiconductor waveguide having a core surrounded in all directions transverse to a photon propagation direction in said interferometer and said resonator by a relatively low refractive index medium and materials.

3. The optical modulator of claim 1, wherein said Mach-Zehnder interferometer and said resonator each comprise a relatively high refractive index photonic well semiconductor waveguide having a core surrounded on opposite sides in a direction transverse to photon propagation direction in said interferometer and said resonator by a relatively low refractive index medium and materials.

4. The optical modulator of claim 1, wherein said resonator is formed as a semiconductor microcavity ring.

5. The optical modulator of claim 1, wherein said resonator is formed as a semiconductor microcavity disk.

6. The optical modulator as recited by claim 1, wherein said first and said second arms are approximately the same length, said length being at least approximately equal to or greater than the diameter of said resonator.

7. The optical modulator as recited by claim 1, wherein said resonator causes a phase-shift in the first portion of the optical signal of between approximately 0° and $\pi$°.

8. The optical modulator of claim 2, wherein said core of each of said Mach-Zehnder interferometer and said resonator has a refractive index $n_{core}$ of between approximately 2.5 and 3.5.

9. The optical modulator of claim 8, wherein said core of each of said Mach-Zehnder interferometer and said resonator is made from InGaAsP, AlGaAs, or InGaN materials.

10. The optical modulator of claim 8, wherein said relatively low refractive index medium has a refractive index $n_{low}$ below approximately 2.0.

11. The optical modulator of claim 10, wherein said relatively low refractive index medium comprises air, acrylic, epoxy, silicon dioxide, aluminum oxide, silicon nitride, spin-on glass, low absorption polymers, photoresist, poly-methyl metacrorate, or polyimide.

12. The optical modulator of claim 10, wherein the ratio of refractive indices $n_{core}/n_{low}$ is greater than approximately 2.0.

13. The optical modulator of claim 3, wherein said core of each of said Mach-Zehnder interferometer and said resonator has a refractive index $n_{core}$ of between approximately 2.5 and 3.5.

14. The optical modulator of claim 13, wherein said core of each of said Mach-Zelinder interferometer and said resonator is made from InGaAsP, AlGaAs, or InGaN/AlGaN materials.

15. The optical modulator of claim 1, wherein said relatively low refractive index medium has a refractive index $n_{low}$ below approximately 2.0.

16. The optical modulator of claim 1, wherein said relatively low refractive index medium comprises air, acrylic, epoxy, silicon dioxide, aluminum oxide, silicon nitride, spin-on glass, low absorption polymers, photoresist, poly-methyl metacrorate, or polyimide.

17. The optical modulator of claim 1, wherein the ratio of refractive indices $n_{core}/n_{low}$ is greater than approximately 2.0.

18. The optical modulator of claim 1, wherein the drive voltage has a maximum amplitude of less than approximately 5 VAC.

19. The optical modulator of claim 1, further comprising:

a second resonator having a second refractive index and being operatively coupled to said other one of said first and second arms across a second gap; and a second voltage source connected to said second resonator for providing a second drive voltage thereto having a polarity opposite of the drive voltage provided to said resonator, wherein changes in amplitude of the second drive voltage cause said second resonator refractive index to change;

said changes in said second resonator refractive index causing a phase-shift in the second portion of the optical signal propagating in said second arm that is approximately equal to the phase-shift in the first portion of the optical signal caused by said resonator coupled to said first arm.

20. A low drive voltage optical modulator comprising:

a Mach-Zehnder interferometer having an input waveguide, first and second arms connected to said input waveguide splitting an input optical signal having a predetermined wavelength into a first portion and a second portion, and an output waveguide connected to said first and second arms;

first and second resonators each having a refractive index and each being operatively coupled to a respective one of said first and said second arms across a respective gap; and a voltage source connected to each of said first and said second resonators for providing a respective drive voltage of opposite polarity thereto, wherein changes in amplitude of the respective drive voltage cause said respective refractive index of said first and said second resonators to change;

said changes in said first resonator refractive index causing a first phase-shift in the first portion of the optical signal propagating in said first arm and said changes in said second resonator refractive index causing a second phase-shift in the second portion of the optical signal propagating in said second arm.

21. The optical modulator of claim 20, wherein said Mach-Zehnder interferometer and said first and said second resonators each comprise a relatively high refractive index photonic wire semiconductor waveguide having a core surrounded in all directions transverse to a photon propagation direction in said interferometer and said resonators by a relatively low refractive index medium and materials.

22. The optical modulator of claim 20, wherein said Mach-Zehnder interferometer and said first and said second resonators each comprise a relatively high refractive index photonic well semiconductor waveguide having a core surrounded on opposite sides in a direction transverse to photon propagation direction in said interferometer and said resonators by a relatively low refractive index medium and materials.

23. The optical modulator of claim 20, wherein said first phase-shift and said second phase-shift are approximately equal to each other.

24. The optical modulator of claim 23, wherein said first phase-shift and said second phase-shift are between approximately 0° and π°.

25. A low drive voltage optical resonator comprising:
- a Mach-Zehnder interferometer having an input waveguide, first and second arms connected to said input waveguide splitting an input optical signal having a predetermined wavelength into a first portion and a second portion, and an output waveguide connected to said first and second arms; and
- a phase-shifter for causing a predetermined phase shift in the first portion of the optical signal propagating in said first arm and being operatively coupled thereto across a gap.

26. The optical modulator of claim 25, wherein said phase-shifter comprises:
- a first resonator having a refractive index; and
- a voltage source connected to said first resonator for providing a drive voltage thereto, wherein changes in amplitude of said first resonator drive voltage cause said first resonator refractive index to change, said changes in said first resonator refractive index causing a first phase-shift in the first portion of the optical signal propagating in said first arm.

27. The optical modulator of claim 26, further comprising a second phase-shifter for causing a predetermined phase shift in the second portion of the optical signal propagating in said second arm and being operatively coupled thereto across a gap.

28. The optical modulator of claim 27, wherein said second phase-shifter comprises:
- a second resonator having a refractive index; and
- a voltage source connected to said second resonator for providing a drive voltage thereto, wherein changes in amplitude of said second resonator drive voltage cause said second resonator refractive index to change, said changes in said second resonator refractive index causing a second phase-shift in the second portion of the optical signal propagating in said second arm.

29. The optical modulator of claim 25, wherein said Mach-Zehnder interferometer and said phase-shifter each comprise a relatively high refractive index photonic wire semiconductor waveguide having a core surrounded in all directions transverse to photon propagation direction in said interferometer and said phase-shifter by a relatively low refractive index medium and materials.

30. The optical modulator of claim 25, wherein said Mach-Zehnder interferometer and said phase-shifter each comprise a relatively high refractive index photonic well semiconductor waveguide having a core surrounded on opposite sides in a direction transverse to photon propagation direction in said interferometer and said phase-shifter by a relatively low refractive index medium and materials.

31. The optical modulator of claim 26, wherein the predetermined phase shift is between approximately 0° and π° and wherein said drive voltage is less than or equal to approximately 5 VAC.

32. The optical modulator of claim 27, wherein the predetermined phase shift caused by each said phase-shifter is between approximately 0° and π° and wherein each said drive voltage is less than or equal to approximately 5 VAC.

* * * * *